United States Patent [19]

Lockery et al.

[11] 4,237,727

[45] Dec. 9, 1980

[54] MECHANICAL MOMENT SENSITIVITY COMPENSATION IN SHEAR BEAM TRANSDUCERS

[75] Inventors: Harry E. Lockery, Sudbury; Eric Laimins, Bellmont, both of Mass.

[73] Assignee: Hottinger Baldwin Measurements, Inc., Framingham, Mass.

[21] Appl. No.: 34,371

[22] Filed: Apr. 30, 1979

[51] Int. Cl.³ .............................................. G01L 1/22
[52] U.S. Cl. ................................................... 73/141 A
[58] Field of Search ...................... 73/141 A, 767, 765; 338/5

[56] References Cited

U.S. PATENT DOCUMENTS

| | | |
|---|---|---|
| 3,949,603 | 4/1976 | Laimins .............................. 73/141 A |
| 3,960,228 | 6/1976 | Nordstrom ...................... 73/141 A X |
| 4,037,469 | 7/1977 | Nordstrom et al. ................. 73/141A |

*Primary Examiner*—Charles A. Ruehl
*Attorney, Agent, or Firm*—W. G. Fasse; D. F. Gould

[57] ABSTRACT

The moment sensitivity of shear beam transducers is mechanically compensated to make such transducers relatively insensitive to load applications which are off-center relative to an optimal point of load application. The compensation is made by gradually increasing the depth of a load application hole in the transducer. The load application hole extends in the direction of a load application axis and its depth is increased until said moment sensitivity becomes substantially zero. In other words, the load sensitivity becomes substantially independent of the location of the point of load application. A further linearization of the moment sensitivity is accomplished by placing inserts into the load application hole.

8 Claims, 12 Drawing Figures

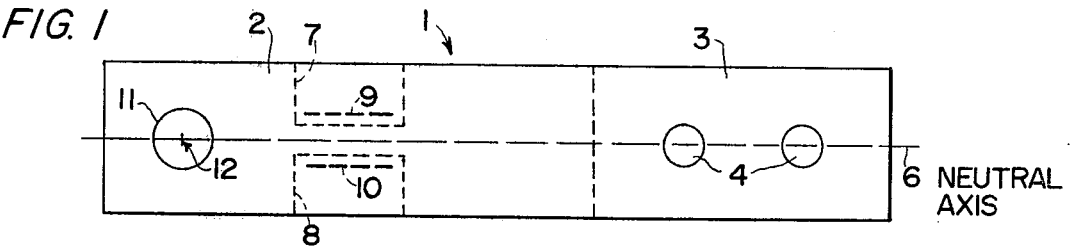
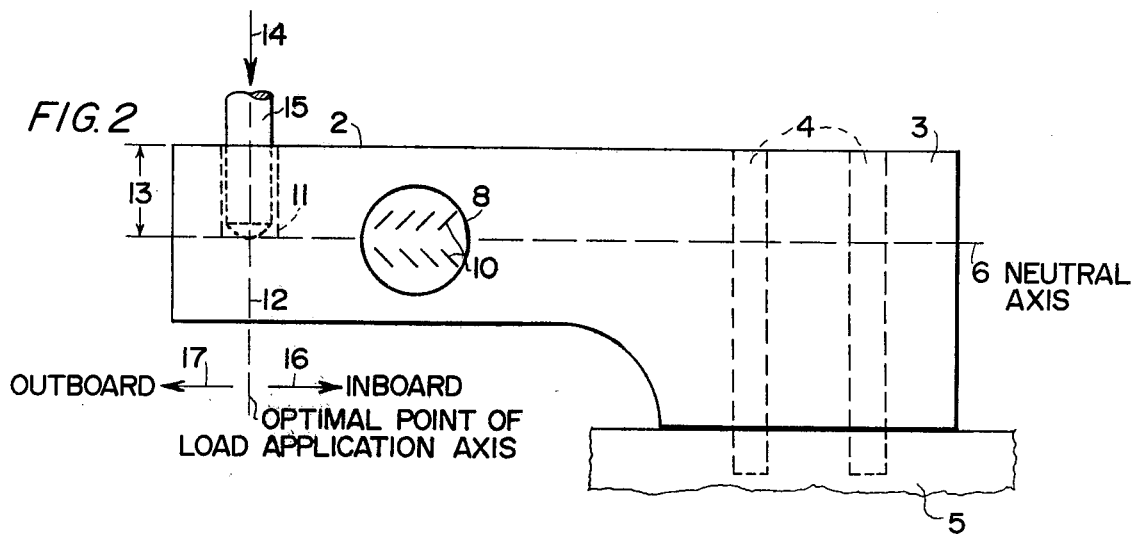
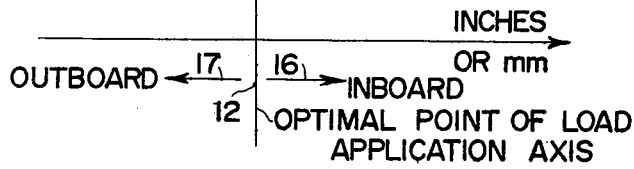
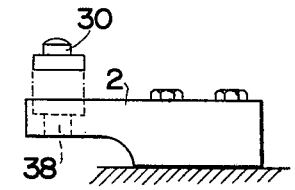
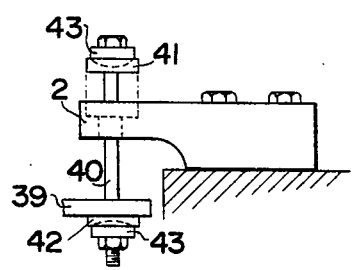
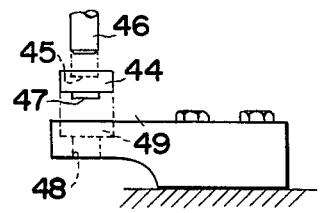

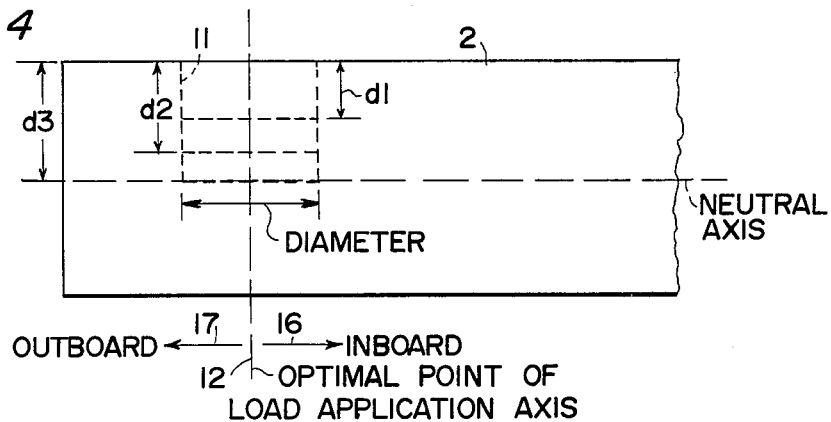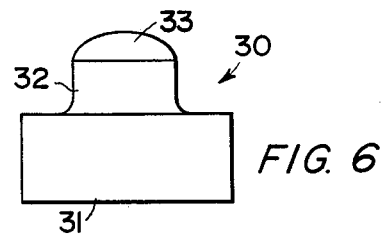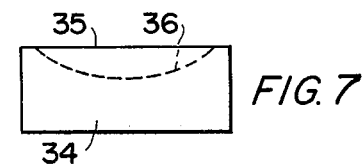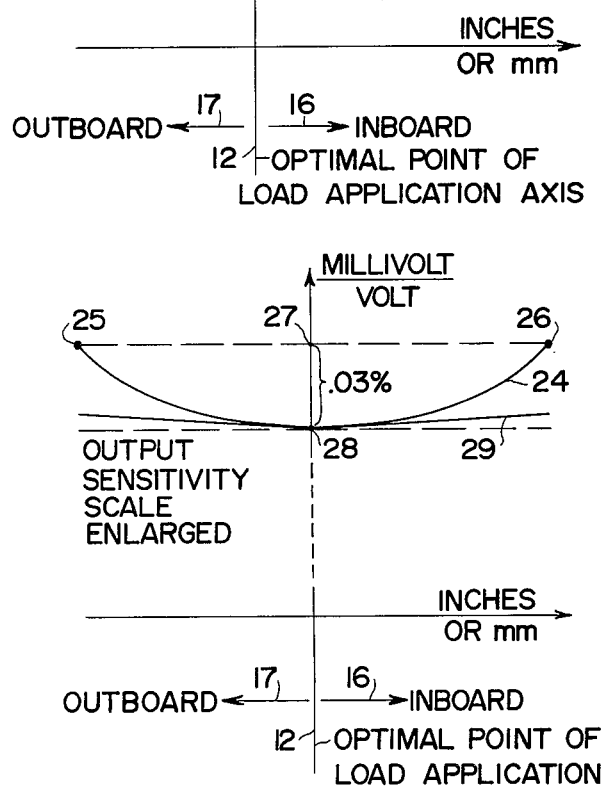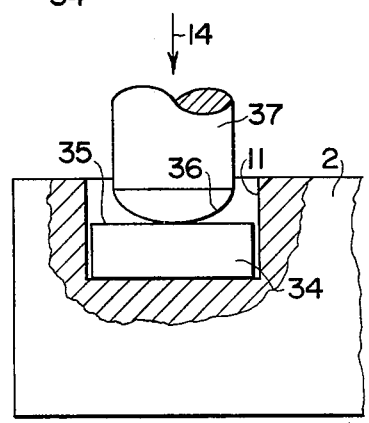

4,237,727

MECHANICAL MOMENT SENSITIVITY COMPENSATION IN SHEAR BEAM TRANSDUCERS

BACKGROUND OF THE INVENTION

The present invention relates to a method for the mechanical compensation of moment sensitivity in shear beam transducers. The invention also relates to shear beam transducers which have been compensated in the mechanical manner disclosed herein.

The load sensitivity of a shear beam transducer should be ideally a constant value for a corresponding constant load. However, such constant relationship between the load and the sensitivity or output of the transducer is subject to certain influences which adversely affect the load sensitivity and thus the respective output which is indicated in millivolts per volts. For example, the constant relationship between the load and output is assured only if the load is applied to the so-called point of load application if the latter is located on the optimal point of load application axis. If the actual point of load application shifts away from the optimal point of load application, the output of the transducer may vary in an undesirable manner in one or the other direction. In other words, the output of the transducer may be larger or smaller than it should be for the given load value. This deviation is referred to in this disclosure as the moment sensitivity of the shear beam transducer. It is desirable to minimize this moment sensitivity and ideally to reduce it to zero.

U.S. Pat. No. 3,949,603 discloses an electrical compensating method for minimizing this moment sensitivity of shear beam transducers. By the electrical compensation disclosed in said U.S. Patent the shear beam transducer becomes relatively insensitive to variations in the point of load application, or rather, to deviations of the actual point of load application from the optimal point of load application.

OBJECTS OF THE INVENTION

In view of the above it is the aim of the invention to achieve the following objects singly or in combination:

to mechanically adjust the moment sensitivity as defined above in the longitudinal direction of a shear beam transducer to such an extent that the moment sensitivity becomes substantially zero;

to achieve said compensation either solely by mechanical means or by mechanical and electrical means in combination;

to improve the relationship between the sensitivity of the shear beam transducer and the point of load application so that said relationship is linear throughout a certain range within which the point of load application may deviate from the optimal point of load application in the longitudinal direction of the shear beam transducer; and to provide an empirical method for compensating shear beam transducers by drilling a hole to a depth which may differ for different types of shear beam transducers but which depth makes the shear beam transducer relatively insensitive to excursions of the point of load application from an optimal point of load application.

SUMMARY OF THE INVENTION

According to the invention there is provided a method for mechanically compensating the moment sensitivity of a shear beam transducer which comprises the following steps. A load application axis extending through an optimal loading point is established for the shear beam transducer. A hole is then drilled in the direction of said point of load application axis into the shear beam transducer to a first depth which is less than a final compensating depth. A defined load is then applied to the shear beam transducer in the optimal loading point and the respective transducer output is then measured. The defined load is then applied to the shear beam transducer off-center relative to the optimal loading point and the respective output is again measured. The two outputs or moment sensitivities are compared to ascertain any difference therebetween. If the difference is substantially zero, there is no need to drill the hole deeper. However, if a difference exists the foregoing steps of drilling, loading, measuring, and comparing are repeated until said difference is substantially zero whereby the shear beam transducer is made substantially insensitive to off-center load applications.

According to the invention there is further provided a shear beam transducer comprising beam means proper, means for securing said beam means at one end thereof and a load application hole at the opposite end thereof. Said load application hole comprising such a depth that the shear beam transducer is substantially insensitive to off-center load applications.

BRIEF FIGURE DESCRIPTION

In order that the invention may be clearly understood, it will now be described, by way of example, with reference to the accompanying drawings, wherein:

FIG. 1 is a top plan view of a shear beam transducer according to the invention with a compensating hole;

FIG. 2 is a side view of the shear beam transducer of FIG. 1;

FIG. 3 shows various output sensitivity characteristics in millivolt per volt as a function of point of load excursions from the optimal point of load application axis;

FIG. 4 illustrates on a somewhat enlarged scale the drilling of a compensating hole to various depths in the direction of the optimal point of load application axis;

FIG. 5 relates directly to FIG. 4 and illustrates the output sensitivity in millivolt per volt as a function of the load application point excursion with various hole depths as parameters;

FIGS. 6 & 7 show different shapes of inserts for providing a further linearization of the shear beam transducer sensitivity;

FIG. 8 shows an insert located into a previously drilled hole at the end of a shear beam transducer;

FIG. 9 shows a diagram similar to FIGS. 3 and 5, however, with an enlarged scale for the output sensitivity to show the further linearization that may be accomplished with placing inserts into the drilled compensating hole; and FIGS. 10, 11, & 12 show various possibilities of combining a compensating hole with different types of inserts.

DETAILED DESCRIPTION OF PREFERRED EXAMPLE EMBODIMENTS AND OF THE BEST MODE OF THE INVENTION

FIG. 1 illustrates a top plan view of a transducer 1 according to the invention having a cantilevered beam section 2 and a securing section 3. The latter is provided with holes 4 through which connecting bolts may extend for securing the transducer 1 to a support 5 as shown in FIG. 2. The transducer 1 has a neutral axis 6. On both sides of said neutral axis 6 there are recesses 7 and 8 in which there are conventionally secured strain gauge elements 9 and 10.

According to the invention a load application hole 11 is drilled into the cantilevered end 2 of the transducer for compensating the above mentioned moment sensitivity as will be explained in more detail below. The hole 11 is drilled in the direction of an optimal point of load application axis 12 to a specific depth which will depend on the particular type or model of transducer also as explained below.

FIG. 2 shows the location of the optimal point of load application axis 12 and the depth 13 of the moment sensitivity compensating hole 11. In practice it is difficult to make sure that the load 14 is applied precisely along the optimal point of load application axis 12, for example, by means of a rod 15. Thus, there may be an excursion in the inboard direction 16 or in the out-board direction 17 as shown in FIG. 2 away from the optimal point of load application axis 12. The inboard excursion 16 is in the direction toward the support means 4, 5. The output excursion 17 is away from the securing means toward the free end of the cantilevered portion 2 of the transducer. Due to such excursions, the output of the transducer is not constant for a constant load unless the transducer is compensated.

The above mentioned U.S. Pat. No. 3,949,603 discloses electrical means for compensating such output deviations from a constant value. Thus, FIG. 3 shows the output of a transducer in millivolts per volt as a function of the excursions away from the optimal point of load application axis as explained above. Curve 18 represents an uncompensated transducer which will provide larger output readings for inboard excursions and smaller readings for outboard excursions of the point of load application away from the optimal load application axis. The electrical compensation will result in an output curve 20 as shown in FIG. 3. Thus, such excursions do not affect the output reading which remains constant over the range of possible excursions. Curve 19 illustrates the output characteristic of an electrically over-compensated transducer.

FIGS. 4 and 5 illustrate that according to the invention the compensation which is achieved according to the prior art by electrical means, may also be achieved by mechanical means, namely, by drilling the load application hole 11 in the direction of the optimal point of load application axis 12 to a compensating depth which may differ for different types of transducers. Thus, drilling the hole merely to a depth "d1" as shown in FIG. 4 will result in a substantially uncompensated response characteristic 21 as shown in FIG. 5. Drilling the hole for the particular transducer type to a depth as shown at the depth "d3" will result in an over-compensated response characteristic 22. However, if the hole depth is extended to the correct depth "d2" a compensated response characteristic 23 is achieved as shown in FIG. 5. It has been found, that substantially no difference may be noticed between an electrically compensated transducer and a properly mechanically compensated transducer.

In practice, the correct depth "d2" is ascertained empirically for each transducer type or model. Initially a hole is being drilled which is intentionally too shallow and the respective output changes are measured as a function of the above explained excursions. When the changes disappear, one knows that the particular type of transducer is compensated. As a practical matter, it has been found, that hole depths in the range of 6 mm to 53 mm and hole diameters in the range of 12 mm to 63 mm are suitable for presently available shear beam transducers. Once the particular hole depth and hole diameter have been established for a given transducer type, no further empirical steps are necessary, and the transducers of that type may be drilled, for example, on numerical controlled machine tools.

FIG. 9 is essentially an illustration similar to that of FIGS. 3 and 5, however the scale applied to the ordinate indicating the output sensitivity in millivolt per volt has been enlarged. The excursions along the abscissa remain on the same scale, for example, in increments of fractions of an inch. FIG. 9 illustrates the inherent non-linearity in the relationship of a transducer output plotted as a function of point of load application excursions. Thus, curve 24 has two end points and 25 and 26 representing the maximally possible excursions. Both excursions cause the same output reading 27 thus indicating, that the transducer has been mechanically compensated as explained above. The non-linearity between the optimal point of load application along the axis 12 providing a reading 28, and the reading 27 representing maximal excursions of the point of load application may be about 0.03%. It has been found according to the invention that this non-linearity may be further reduced by inserts such as shown in FIGS. 6 and 7 placed into the hole 11 after the latter has been drilled to the correct, compensating depth. These inserts result in an output characteristic curve 29 in which the above mentioned inherent non-linearity between the output of a transducer and the point of load excursions has been further reduced as shown in FIG. 9.

FIG. 6 shows an insert 30 having a base 31 and a load application extension 32 with a spherical top surface 33. The diameter of the base 31 may be within the range of 30 mm to 72 mm. The height of the base 31 may be within the range of 12 mm to 32 mm. The load application extension may have a diameter within the range of 18 mm to 40 mm and a height within the range of 6 mm to 12 mm. The spherical top surface may have a radius of curvature within the range of 100 mm to 150 mm.

FIG. 7 discloses a simple insert 34 which may have a plain top surface 35 or a spherically recessed load application surface 36. The diameter and height of the insert 34 may be within the range of 30 mm to 72 mm and 12 mm to 32 mm respectively. The radius of curvature of the spherically recessed load application surface 36 may be within the range of 100 mm to 150 mm.

FIG. 8 illustrates the free end 2 of a transducer with a hole 11 drilled to the compensating depth and with an insert 34 placed into the hole 11. The insert 34 has a plain top surface 35 which cooperates with a spherical tip 36 of a load application rod 37.

FIG. 10 illustrates the insertion of a so-called load button adaptor 30, for example, as shown in FIG. 6, into a hole 38 having two different diameters and extending vertically through the free end of the transducer.

In FIG. 11 the load 39 is suspended from the free end 2 of the transducer by means of a bolt assembly 40 including spherically recessed insert washer 41 and spherically recessed washer 42 as well as spacers 43 having a spherically protruding surface fitting into the respective recess.

FIG. 12 illustrates a blind hole adaptor 44 having a recess 45 adapted for cooperation with the load application rod 46 and a protrusion 47 adapted to cooperate with a smaller diameter hole portion 48 which facilitates the centering of the insert 44 in the hole 49. The loading rod or pin 46 may have a convex tip, as shown in FIG. 8 and the recessed hole 45 may be adapted accordingly.

It is an advantage of the present mechanical compensating mode that it may be applied alone or in combination with the electrical type of compensation disclosed in the prior art.

Under certain circumstances it may be desirable to drill the depth of the hole to such an extent that the bottom of the hole coincides with the neutral axis 6 of the transducer. In such an instance the application of bending moments in the longitudinal direction as indicated by the neutral axis or the application of twisting moments in a direction transverse to the longitudinal axis, would be substantially prevented. It has been found, that by drilling the hole to the neutral axis, the advantage of removing bending moments and twisting moments might be offset somewhat by an unfavorable response characteristic. This in turn may, however, be improved by a combined electrical and mechanical compensation as described above.

Although the invention has been described with reference to specific example embodiments, it will be appreciated, that it is intended to cover all modifications and equivalents within the scope of the appended claims.

What is claimed is:

1. A method for mechanically compensating the moment sensitivity of a shear beam transducer, comprising the following steps: establishing a load application axis extending through an optimal loading point of said shear beam transducer, drilling, in the direction of said load application axis, a hole into said shear beam transducer to a first depth which is less than a final compensating depth, applying a defined load to the shear beam transducer along said load application axis in said hole, measuring the respective transducer output, applying said defined load to the shear beam transducer off-center relative to said load application axis and again measuring the respective off-center transducer output, comparing the two transducer outputs to ascertain any difference therebetween, and continuing the foregoing steps until said difference is substantially zero, whereby the shear beam transducer is made substantially insensitive to loads applied off-center relative to said load application axis.

2. The method of claim 1, further comprising placing insert means into said drilled hole.

3. The method of claim 1, wherein said final compensating hole depth is first ascertained empirically for a given shear beam transducer type or model and wherein all transducers of the same type are then drilled to the same empirically ascertained final compensating hole depth.

4. A shear beam transducer, having a mechanically compensated moment sensitivity produced by the method of claim 1 or 3, whereby said transducer is substantially insensitive to off-center load applications.

5. The shear beam transducer of claim 4, wherein said final compensating depth is within the range of 6 mm to 53 mm, and wherein said drilled hole has a diameter within the range of 12 mm to 63 mm.

6. The shear beam transducer means of claim 4, further comprising disk type insert means dimensioned to fit into said load application hole means.

7. The shear beam transducer of claim 6, wherein said disk type insert means have a thickness within the range of 12 mm to 32 mm.

8. The shear beam transducer of claim 6, wherein said disk type insert means have spherical surface portions.

* * * * *